Figure 1:
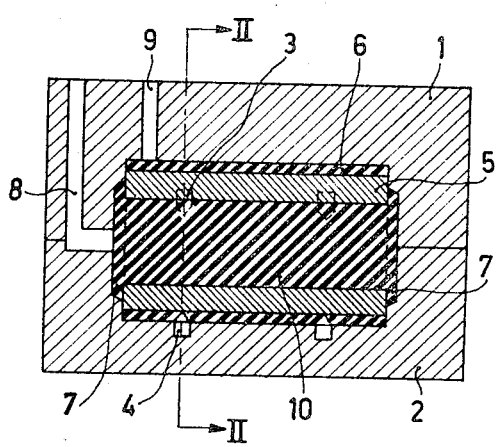

Feb. 6, 1968  R. H. DIJKEN ET AL  3,366,995
APPARATUS FOR MANUFACTURING RINGS OR CYLINDERS
OF FERROMAGNETIC MATERIAL
Filed April 20, 1965  2 Sheets-Sheet 1

REINDER H. DIJKEN *INVENTORS*
JOLLE JAGER
MINNE KRIKKE
JOHAN KRAUS

BY *Frank R. Trifari*

AGENT

United States Patent Office 3,366,995
Patented Feb. 6, 1968

3,366,995
APPARATUS FOR MANUFACTURING RINGS OR CYLINDERS OF FERROMAGNETIC MATERAL
Reinder Hendrik Dijken, Jolle Jager, and Minne Krikke, Drachten, and Johan Kraus, Emmasingel, Eindhoven, Netherlands, assignors to North American Philips Company, Inc., New York, N.Y., a corporation of Delaware
Filed Apr. 20, 1965, Ser. No. 449,576
Claims priority, application Netherlands, Apr. 24, 1964, 64—4,520
4 Claims. (Cl. 18—36)

The invention relates to an apparatus for manufacturing a permanent magnet rotor for small motors comprising a ring of sintered, oxidic, magnetic, particularly ferromagnetic material, which is to be filled with a thermoplastic or thermohardening synthetic substance, said filling consisting of a polyamide or a polycarbonate resin.

In practice, the manufacture of such a ring has been found to give rise to serious difficulties. The sintered, oxidic, magnetic material, particularly the ferromagnetic material known under the trade name "Magnadur" is not satisfactorily resistant to tensile forces, whereas compressive forces can be withstood quite well. When a ring of such a material is disposed in a mold and filled by injecting a heated liquid mass of for example nylon or a polycarbonate under high pressure (of the order of about 250 kgs./cm.$^2$) tensile stress occurs in the ring, which is found to be cracked after cooling of the mass. If the ring should fit with absolute precision in the mold without any tolerance in the dimensions of the mold and of the ring, the ring might be sufficiently supported by the mold, but in practice this is, of course, not possible.

According to the method of using the apparatus of this invention in manufacturing a rotor of the kind set forth it is characterized in that the magnetic ring is disposed in a cavity of a closed mold somewhat larger than the ring and which is provided with supply ducts for the synthetic substance. The liquid synthetic substance is injected on both the inner side and on the outer side of the enclosed ring. The ring is removed from the mold, subsequent to cooling, and the synthetic substance is removed from the outer side thereof. In this way both compressive stress and tensile stress occur in the ring, which compensate each other, so that tensile stress sufficient to break the ring no longer occurs. Since the outer surface of the ring is larger than the inner surface, the compressive stress is usually greater, which is advantageous. The layer of synthetic substance on the outer side of the ring need be only thin and may be readily removed after the rotor thus formed has been removed from the mold.

In another embodiment of the method for using the apparatus of the invention, the synthetic substance may be first applied to the outer side of the ring, while during this operation or immediately thereafter the synthetic substance is provided in the interior of the ring. It is thus ensured that at any rate tensile stress cannot be produced in the ring.

A mold for carrying out the method according to the invention is characterized in that it comprises a cavity having one or more ducts and having a larger diameter than the outer diameter of the ring and having a number of points of location for the ring. This is a simple way of carrying out the method and would avoid difficulties encountered in loosening the ring for removal from the mold.

Said difficulties are completely avoided, if according to the invention the points of location are formed by one or more inwardly projecting ridges provided on the wall of the cavity, and extending parallel to the axial center line of the ring.

A further feature of this mould is to ensure that the pressure exerted on the outer side of the ring occurs simultaneously and preferably earlier than the pressure on the inner side, consists of providing at least two ducts for the supply of the synthetic substance. One duct at least opening out in the cavity (cavities) on the outer side of the ring and one further duct communicating with the interior of the ring. A common supply duct for the two said ducts may be used but the supply duct communicating with the outer side of the ring has a larger diameter or opening than the duct communicating with the interior of the ring.

Figure 2:
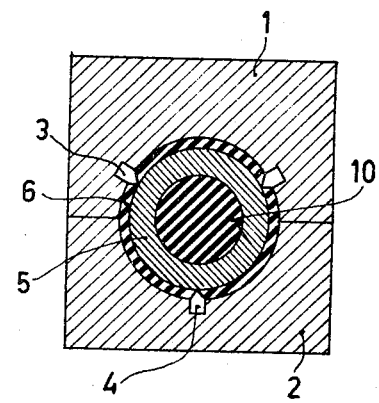
Figure 3:
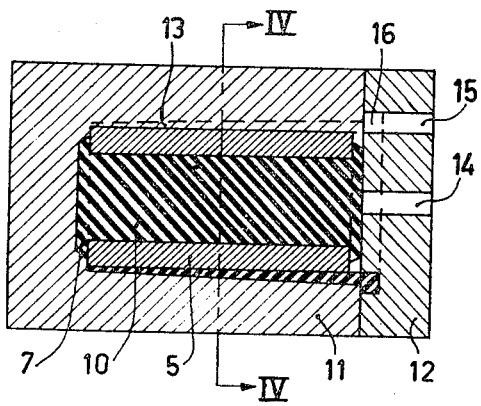
Figure 4:
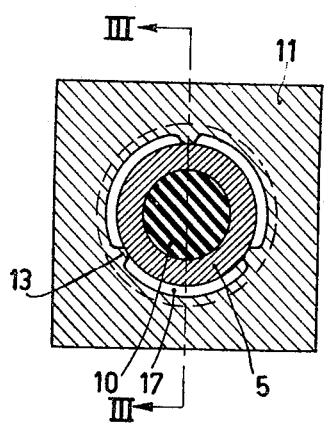
Figure 5:
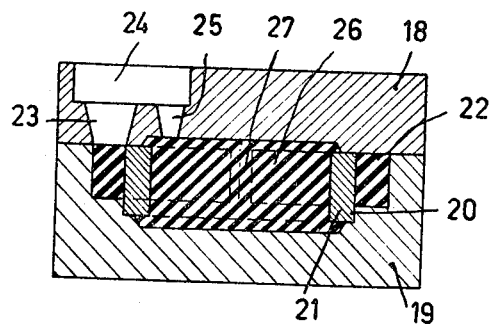
Figure 6:
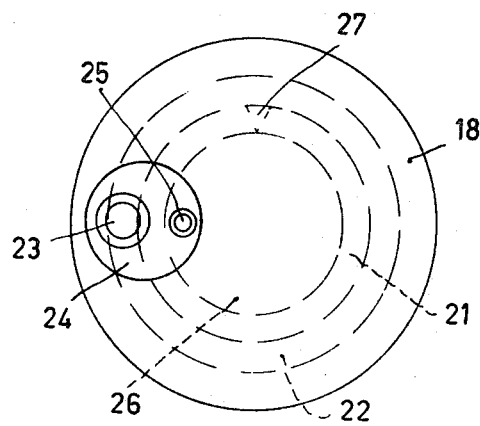

The invention will be described more fully with reference to the drawing, which shows embodiments of moulds by means of which a permanent magnetic rotor body for use in a small electric machine can be manufactured and in which FIG. 1 is a longitudinal sectional view of a mould and
FIG. 2 is a sectional view of the mould of FIG. 1 taken on the line II—II in the direction of the arrow and
FIG. 3 is a longitudinal sectional view of a further embodiment.
FIG. 4 is a cross sectional view of the mould of FIG. 3 taken on the line IV—IV in the direction of the arrow.
FIG. 5 is a longitudinal sectional view of a still further embodiment.
FIG. 6 is a plan view of the mould of FIG. 5.

Referring to FIGS. 1 and 2, reference numeral 1 designates the upper part of a split mould and 2 the lower part. The upper part has four inwardly projecting pins 3 and the part 2 has two similar pins 4. Between said pins a ring 5 of sintered, oxidic, ferromagnetic material, for example Magnadur, is held. The diameter of cavity 6 in the mould, accommodating the ring 5, exceeds the outer diameter of the ring 5. The mould also has two depressed parts or end recesses 7. Two supply ducts 8 and 9 are provided in the mould as shown. Duct 8 communicates with the interior 10 of the ring 5 and duct 9 with the space between the ring 5 and the boundary of the cavity 6.

When the injection machine presses liquid nylon or a liquid polycarbonate through the duct 8 under the normal injection molding pressure for such materials, of about 250 kgm./cm.$^2$, the ring 5 will break or crack, since sintered, oxidic, ferromagnetic material is not capable of withstanding much tensile stress. According to the invention, liquid nylon or polycarbonate is injected through the duct 9 simultaneously or prior to injection through duct 8 with a small overlapping period, under the same pressure, so that compressive stress occurs in the ring 5 which can be satisfactorily withstood by the material. It is found that after cooling the ring 5 has no cracks or breaks. After the ring 5, which now has a filling of nylon or polycarbonate and is enclosed between two flanges 7 of the synthetic substance, is removed from the mold the superficial external material is removed, so that a body is obtained which is suitable for use as a permanent magnetic rotor for a small electric machine, for example, a motor or a generator, after magnetisation and after being provided with a shaft.

FIGS. 3 and 4 show a mould 11, which is closed by a lid 12. The mould 11 has a cavity with three ridges 13 which extend inwardly and taper towards the bottom of the mould cavity, i.e. the closed end of the mould remote from lid 12. The ring 5 is enclosed between the ridges: the diameter of the space between the ridges 13 is fairly equal to the outer diameter of the ring 5.

The lid 12 has two supply openings 14 and 15 for liquid synthetic substance. The opening 14 communicates with the interior 10 of the ring 5 and the opening 15 opens into annular chamber 16 which communicates with spaces 17 between the ridges 13: the spaces 17 have a length dimension decreasing towards the bottom. As an alternative, the width dimension of each ridge 13 may increase gradually towards the mould bottom where the depth of spaces 17 is least. By this measure, as well as by the provision of the decreasing depth of spaces 17, the rotor can be readily removed from the mould. After cooling and removal of the rotor from the mould, the synthetic substance which fills the spaces 17 can be readily removed from the outer side of the ring 5.

As is shown in FIGS. 5 and 6 a mould may comprise two generally circular portions 18 and 19. The portion 19 has a chamber 20 accommodating a short ring 21 of sintered, oxidic, ferromagnetic material. A chamber 22 is left around the ring 21 and communicates via a duct 23 with the supply opening 24. The opening 24 communicates through a second duct 25 with the interior of the ring 21. The inner diameter of the duct 23 exceeds that of the duct 25, so that, when the hot liquid synthetic substance is forced under pressure into the supply opening 24, the space 22 around the ring 21 is filled first, while simultaneously the space 26 in the ring only starts being filled, so that again no tensile stress will be produced in the ring 21.

It is sometimes advisable to provide a ridge 27 in the space 22, so that a small space is left between the peak or apex of the ridge and the ring 21. The synthetic substance can then be removed more readily (by peeling) from the outer side of the ring, after cooling and removal from the mould.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. A mould for injection moulding a rotor having a ring of sintered, oxidic, ferromagnetic material immovably supported on a body of synthetic polymeric material comprising means defining a closed mould cavity, said cavity having said ring disposed therein, said cavity having a cross sectional dimension greater than the diameter of said ring, means projecting into said cavity for engaging said ring spaced from the walls of said mould defining said cavity, a first inlet duct in said mould communicating with the portion of said cavity surrounding the exterior surface of said ring and a second inlet duct in said mould communicating with the portion of said cavity within the interior of said ring.

2. A mould according to claim 1 wherein said means projecting into said cavity comprise ridges connected to the inside wall of said mould defining said cavity, said ridges extending parallel to the centerline of the ring.

3. A mould according to claim 2 wherein said ridges are gradually tapered in the direction of their length whereby one end of each said ridge projects a greater distance into said mould cavity than the opposite end of said ridges.

4. A mould according to claim 1 wherein said first inlet duct is of a larger cross sectional dimension than the corresponding dimension of the said second duct.

References Cited
UNITED STATES PATENTS

| | | | |
|---|---|---|---|
| 1,856,382 | 5/1932 | Gasson et al. | 249—91 |
| 2,160,108 | 5/1939 | Reid | 18—36 XR |
| 2,604,661 | 7/1952 | Karns | 18—36 |
| 3,114,598 | 12/1963 | Beckadolph et al. | 18—36 XR |
| 3,246,369 | 4/1966 | Rhoads et al. | 18—36 |

J. HOWARD FLINT, JR., *Primary Examiner.*